Feb. 25, 1936.   R. H. WAPPLER ET AL   2,031,682
METHOD AND MEANS FOR ELECTROSURGICAL SEVERANCE OF ADHESIONS
Filed Nov. 18, 1932

INVENTORS
Reinhold H. Wappler,
Frederick C. Wappler,
BY
ATTORNEY

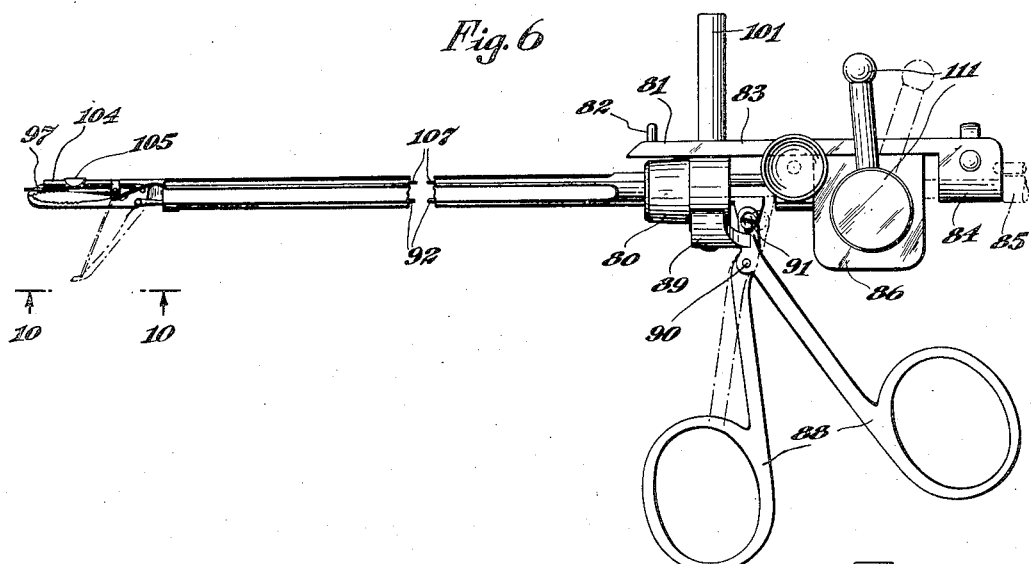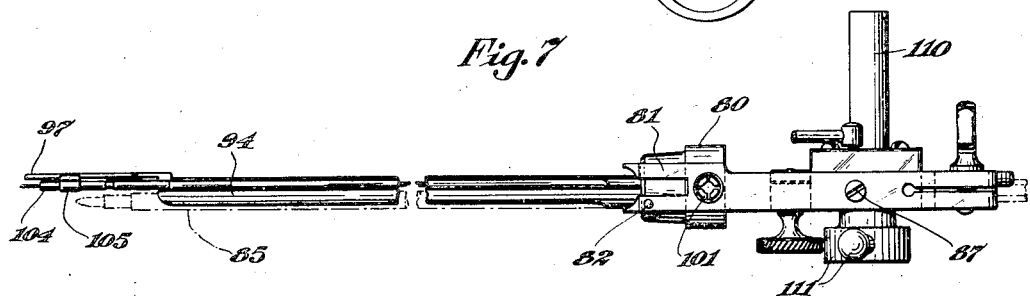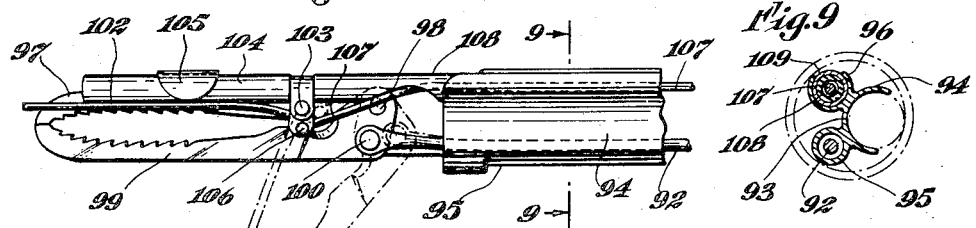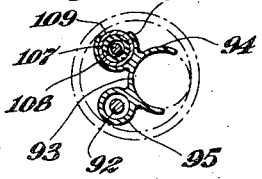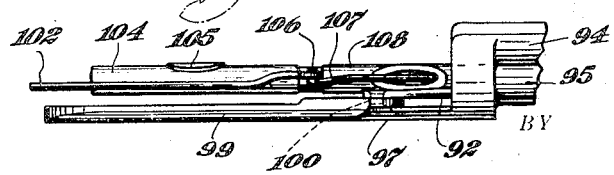

Patented Feb. 25, 1936

2,031,682

UNITED STATES PATENT OFFICE 2,031,682

METHOD AND MEANS FOR ELECTROSURGICAL SEVERANCE OF ADHESIONS

Reinhold H. Wappler, Yonkers, and Frederick Charles Wappler, New York, N. Y.; said Frederick C. Wappler executor of said Reinhold H. Wappler, deceased Application November 18, 1932, Serial No. 643,150

11 Claims. (Cl. 174—89)

Our present invention relates generally to the surgical art, and has particular reference to an improved method for severing adhesions and, coordinately, to an improved type of instrument for accomplishing this object.

It is a general object of our invention to provide an improved electro-surgical method and means for effecting an efficient severance of adhesions; more particularly, a method and instrument which employs the cutting and/or coagulating capabilities of modern high-frequency electric current.

The primary purpose for which our present method and instrument are devised, although obviously our invention is not restricted to any specific application, lies in the cutting through of adhesion bands in the pleural cavity, the presence of such bands being highly undesirable, as is well known in the surgical art, for the reason, among others, that normal and complete respiration is impeded thereby; and in many cases convalescence from pleural or pneumonic ailments is prevented.

The severance of an adhesion band in the pleural cavity is particularly dangerous because of the serious consequences resulting from unchecked hemorrhage. The modern technique of electro-surgery, employing the characteristics of high-frequency cutting and/or coagulating currents, suggests the possibility of harnessing this technique to the present objective. But it has been found to be unsatisfactory, in many respects, merely to insert a cutting electrode and to cut through an adhesion with it. In the first place, the procedure may not feasibly be carried out under water, and the generation of fumes, which impede visibility, is therefore a problem that must be reckoned with. In the second place, and of greater significance, is the fact that most adhesions are in a stretched or tensioned condition when the lung is collapsed to effect pneumothorax. Cutting through a tensioned element of this character is precarious because of the danger that the band will tear or divide prematurely, with the result that stumps which have not been rendered fully hemostatic may render the attempted operation fatal to the patient.

It is a general object of our invention to provide an improved method and means whereby an unhurried and thoroughly controllable operation may be performed, under continued and assured illuminated vision, and with minimum danger from the standpoint of hemorrhage. Our present invention provides for the accomplishment of the desired objective with the necessity for only a single puncture through the pleura, and by means of a single and unitary instrument which is compact, easy to manipulate and control, and which embodies within itself the complete instrumentalities and means for performing all the necessary steps involved.

Briefly, our present method involves the step or steps of preliminarily engaging or clamping the adhesion firmly at or adjacent to the area at which it is to be cut, and maintaining this engagement until the operation of severance has been completed. Preferably, the adhesion is grasped or clamped at two spaced areas on opposite sides of the area to be cut, and our present procedure provides for cutting through the adhesion without releasing such engagement, whereby the resultant stumps may be thoroughly examined and treated, if necessary, all in an unhurried manner, before they are finally released. An instrument constructed in accordance with the present invention consists essentially, therefore, of a clamping means for engaging the adhesion in the manner referred to, together with a cutting electrode which is constructed and arranged to conduct high-frequency cutting current to the area contacted thereby, and to move in a controllable manner and direction, whereby the desired severance may be effected without releasing the clamping means.

Our invention also preferably provides a means for preliminarily coagulating the area at and adjacent to the line along which the adhesion is to be cut, our preferred mode of procedure thus involving the successive steps of clamping the adhesion, coagulating the desired area, cutting through the coagulated area, and finally releasing the resultant stumps. An instrument embodying the features of our present invention is provided with means for accomplishing these results, and preferably provides for the coagulating procedure through the medium of the clamping members themselves.

In accordance with the general objects of our invention, our present instrument is also provided in an efficient and compact manner with a telescopic means, an illuminating means, suitable electric binding terminals for establishing desired connections with the respective currents which are required, means for efficiently insulating the cutting electrode from the other portions of the instrument, mechanisms for controlling the movements and operations of the several parts in a simple and reliable manner, and means for withdrawing from the area of operation such fumes as may be generated in the vicinity of the telescope objective. The entire instrument is mounted and constructed in a unitary form which permits it to be inserted into the pleural cavity through only a single opening provided for this purpose, and the several parts are so constructed and arranged that disassembly for sterilization purposes may be easily accomplished.

We achieve the foregoing objects, and such other objects as may hereinafter appear or be pointed out, in the manner illustratively exemplified in the accompanying drawings, wherein—

Figure 6 is a view similar to Figure 1, showing a modified type of instrument;

Figure 7 is a view similar to Figure 2, showing the operative parts of the instrument of Figure 6;

Figure 8 is an enlarged fragmentary view taken in the same direction as Figure 6;

Figure 9 is a cross-sectional view taken substantially along the line 9—9 of Figure 8;

Figure 10 is an enlarged fragmentary view taken from the bottom, i. e., substantially in the direction 10—10 of Figure 6;

Figure 11:
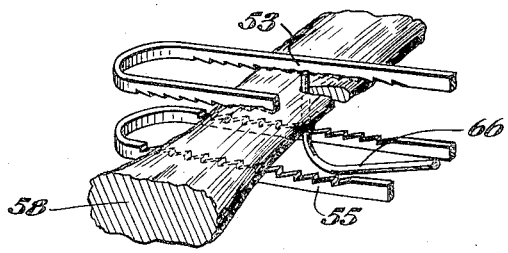
Figure 11 is an enlarged perspective view of the operative members of the instrument of Figures 1–5, illustrating its mode of use.
Figure 12:
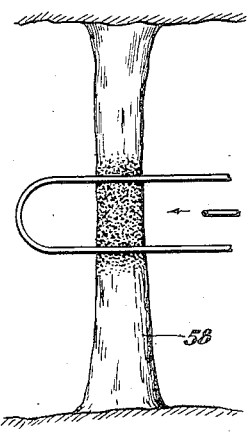
Figure 13:
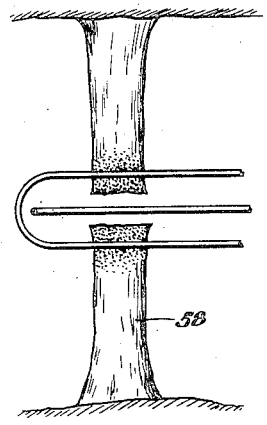
Figure 14:
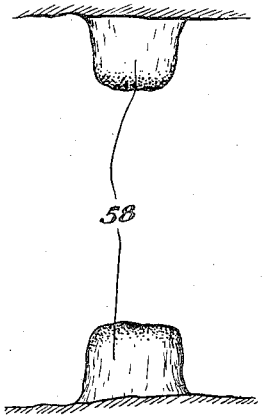
Figure 15:
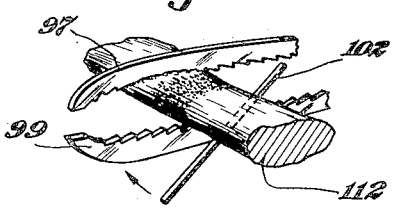
Figure 16:
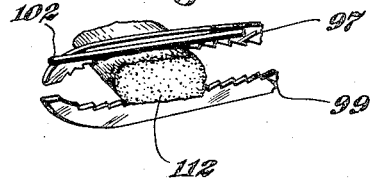
Figure 17:
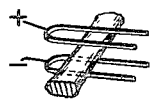
Figure 18:
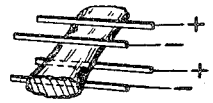
Figure 19:

Figures 12, 13, and 14 are diagrammatic plan views illustrating the mode of procedure;

Figure 15 is a view similar to Figure 11, showing the mode of operation of the instrument of Figures 6–10;

Figure 16 is a view similar to Figure 15, illustrating a further step in the present method;

Figure 17 is a view similar to Figure 11, diagrammatically illustrating a possible modification;

Figure 18 is a view similar to Figure 17, illustrating a possible further modification; and Figure 19 is a view similar to Figure 17, illustrating a possible further modification.

While the structural characteristics of an instrument constructed in accordance with our present invention may vary in a number of ways, the two instrumentalities herein chosen for purpose of illustration have proven satisfactory and preferable, but it will be understood that many of the details of construction need not necessarily be restricted to the details herein illustrated and now to be described.

Figure 1:
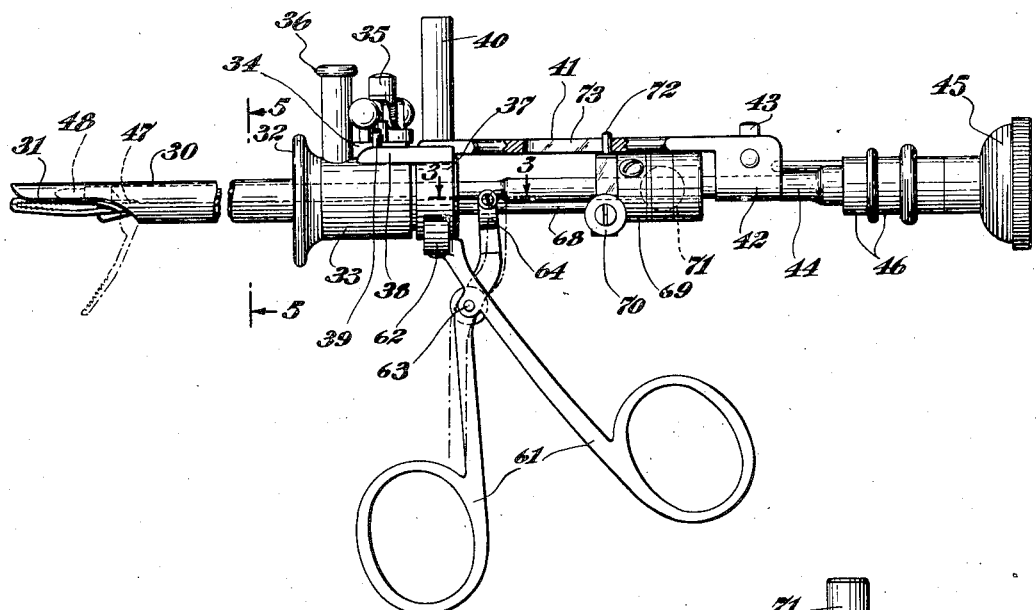
Figure 1 is a side view of an instrument embodying the features of our present invention, a portion being broken away for the sake of compactness.

The instrument of Figure 1 embodies the usual endoscopic tube or sheath 30, provided with the obliquely lateral fenestra 31 at the forward end, and terminating at the rear end in the collar 32 and the connection neck 33. The latter is preferably provided with a ridge or block 34 and a clamping means 35, by means of which the operative insertable portions of the instrument may be secured to the sheath 30. The neck 33 is also provided with the irrigation outlet 36 which communicates with the interior of the tube 30.

The operative insert member includes the usual connection plug 37, which carries the forwardly extending fork 38 and pin 39 for cooperation with the block 34 and clamping means 35. The plug 37 preferably carries the electric binding post 40 which need not be insulated and which establishes an electrical connection with all the metallic parts of the instrument and all parts not specifically insulated therefrom. This binding post is adapted to be connected to any suitable source of high-frequency current, as will be explained more fully hereinafter.

In the present instrument, a rearwardly extending support 41 is rigidly secured to the plug 37 and terminates in a bearing 42 provided with the clamp 43, by means of which the rear end of a suitable telescope 44 may be supported. This telescope is preferably of the character illustrated in United States Letters Patent No. 1,680,491, and consists of an eyepiece 45, the electric terminal rings 46 (for establishing suitable connection with the illuminating lamp), the forward objective 47 (which commands a forwardly oblique field of vision), and the illuminating lamp 48 mounted upon an attenuated tip.

Figure 5:
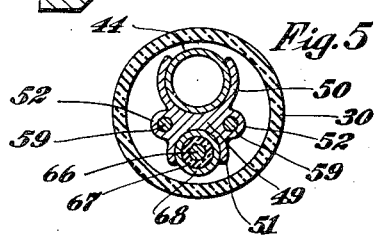
Figure 5 is an enlarged cross-sectional view taken substantially along the line 5—5 of Figure 1, with certain elements omitted for the sake of clearness.

Carried by the plug 37 is a forwardly extending, elongated stem 49 (Figure 5) which carries an upwardly projecting guiding tube or channel 50, a downwardly extending guiding tube or channel 51, and lateral guiding tubes 52. The channel 50 snugly yet slidably supports and engages the body of the telescope 44, it being understood that the plug 37 is provided with a suitable bore through which this telescope slidably yet snugly extends.

Figure 2:
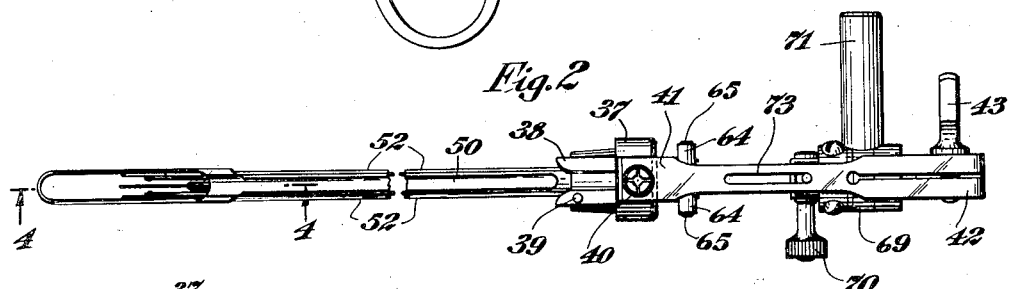
Figure 2 is a top view of the operative portions of the device of Figure 1.

Carried at the forward end of the stem 49 is the rigid and immovable clamping jaw 53 which is substantially U-shaped, as illustrated most clearly in Figures 2 and 11, and which is preferably provided with teeth 54. The axis of the U, it will be observed, lies substantially in alignment with the axis of the stem 49.

A complementary jaw 55 is pivotally associated with the jaw 54 at the rear points 56, it being understood that the jaw 55 is similarly U-shaped, and that the reference numeral 56 is intended to apply to both points of pivotal connection, there being a pivot point of this character in association with each pair of adjacent arms of the U-shaped jaws. The jaw 55 is preferably provided with teeth 57, and it is so mounted in association with the fixed jaw 53 that when a member, such as the adhesion band 58 of Figure 11, is positioned between the jaws, the two jaws will lie substantially parallel to each other.

Figure 4:
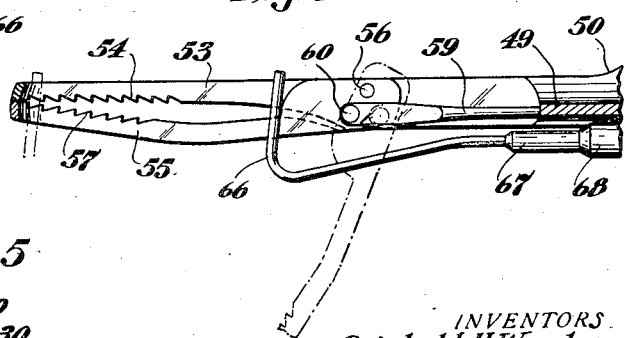
Figure 4 is an enlarged fragmentary view taken substantially along the line 4—4 of Figure 2.

The movable jaw 55 is adapted to be swung between the full-line position and the dot-and-dash-line position of Figures 1 and 4 by means of a control mechanism which may, for example, consist of two rearwardly extending control rods 59, extending rearwardly through the guide tubes 52. The forward end of each guide rod 59 is pivotally connected, as at 60, to the corresponding arm of the jaw 55, so that axial reciprocation of the rods 59 will pivot the jaw 55 around the pivots 56 and thereby move it in the manner hereinbefore referred to and clearly illustrated in Figures 1 and 4.

Figure 3:
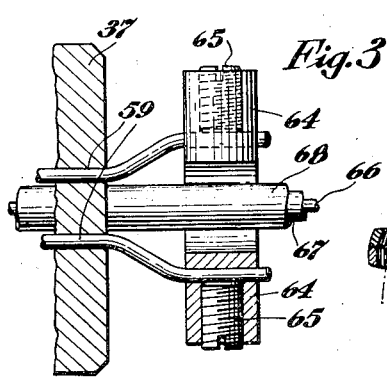
Figure 3 is an enlarged fragmentary view taken substantially along the line 3—3 of Figure 1.

The rods 59 are preferably controlled by a scissors-like control member 61 mounted at the rear end of the instrument, one of the handles being rigidly secured, as at 62, to the bottom of the plug 37, and the other handle being pivotally mounted, as at 63, to the fixed handle, so as to be movable into and out of the full-line and dot-and-dash-line positions of Figure 1. The free end of the movable handle is forked, as at 64, and each prong of this fork engages with one of the rods 59, as, for example, by means of set screws 65, as illustrated most clearly in Figure 3.

From the description given, it will be obvious that by bringing the handles of the mechanism 61 toward each other, the jaws 53 and 55 will be moved into closed relationship; and by spreading the handles, the rods 59 will be retracted and will thereby accomplish an opening of the jaws.

The cutting electrode of the instrument illustrated in Figures 1-5 consists of an attenuated electrode wire 66 whose forward free end is arranged along a substantially transverse direction and is positioned within the space between the opposite longitudinal sides of the jaws. This wire emanates from the forward end of a sheath of insulation 67 which is, in turn, mounted in a metallic sheath 68. The body of the wire 66 extends rearwardly for the full length of the instrument, and it is ensheathed in the insulation 67 and the sheath 68 throughout its entire length. This assembly is mounted for axial reciprocation within the guide tube or channel 51, as shown most clearly in Figure 5.

At the rear end, the sheath 68 passes through a suitably prepared bore in the plug 37, thence through the space provided by the two prongs of the forked end 64, and thence into final association with a rear terminal block 69 provided with the control handle 70. This block carries the electric binding post 71, and the interior assembly has not been illustrated although it will be understood that, in any suitable or convenient manner, the interior conductive terminal portion of the post 71 is connected electrically with the rear end of the wire 66. The post 71 is preferably of insulating material, as is the major portion of the block 69 with which it is connected, and it will be understood that although all other metallic portions of the instrument are arranged and assembled in mutually uninsulated relationship, and in electrical connection with the binding post 40, the wire 66 is mounted in an insulated relationship by means of the insulation sheath 67 and the electrical association of parts at the rear block 69 and the post 71.

The block 69 carries the upwardly extending pin 72 which is slidably positioned within a longitudinal slot 73 provided for this purpose in the supporting arm 41; and by manipulating the handle 70, the cutting electrode assembly may be reciprocated axially within the limits defined by the ends of the slot 73. The effect of this movement upon the operative forward end of the wire 66 is to reciprocate the latter between the full-line position of Figure 4 and the dot-and-dash-line position. This movement, it will be noted, is along an axial direction, and within the confines of the space bounded by the opposite longitudinal side portions of the jaws 53 and 55.

The block 69 is provided with a suitable bore to permit passage therethrough of the telescope 44, and this engagement is sufficiently loose to permit the block 69 to be slid back and forth in the manner described.

The mode of operation of the instrument hereinbefore described is illustrated most clearly in Figures 11-14. The instrument having been inserted through a suitable opening in the pleura, the adhesion to be severed is engaged by the jaws 53 and 55 in substantially the manner illustrated in Figures 11, 12, and 13. This engagement is effected adjacent to the area at which the severance is to be effected. A suitable coagulating current is then conducted to the jaws 53 and 55 and caused to pass into and through the adhesion 58 so as to coagulate the latter at and between the areas of engagement. This passage of current may be effected in a variety of ways, the preferred mode being to connect the patient with a suitable indifferent electrode (not illustrated). An electrical connection is made between this indifferent electrode and one terminal of a suitable source of coagulating current. An electrical connection is then established between the other terminal of such current source and the binding post 40, thereby establishing an electrical connection between the last-mentioned terminal of the current source and both jaws 53 and 55. These jaws thus serve as coagulating electrodes, and the passage of current through the adhesion and through the patient's body to the indifferent electrode will cause coagulation to take place at and adjacent to the areas of engagement of the jaws 53 and 55.

During this procedure, the cutting electrode 66 is in its retracted position. When the area to be cut is satisfactorily coagulated, especially the area lying between the spaced areas of engagement of the opposite longitudinal sides of the jaws, a suitable cutting current is caused to pass through the electrode 66. This may also be accomplished in a variety of ways, preferably by maintaining the indifferent electrode connection with the patient's body, and by establishing an electrical connection between the opposite terminal of a suitable source of cutting current and the binding post 71. The connections with respect to the coagulating procedure will in the meantime have been disconnected, or, at least, rendered inoperative. The cutting electrode 66 is then advanced, as indicated in Figures 11 and 12, with the result that the electrode wire 66 will cut a path through the coagulated clamped area of the adhesion 58.

It is to be noted that this cutting procedure is accomplished without releasing the engagement of the adhesion 58, and that, because of this mode of procedure, the opposite resultant stumps do not of themselves snap back out of the range of vision and operation. Quite to the contrary, the opposed stumps are maintained in clamped relationship, as indicated in Figure 13, and it is therefore within the control of the surgeon immediately to detect and to remedy any deficiencies in establishing a complete and thorough hemostasis.

After the surgeon is satisfied that the procedure has been satisfactorily accomplished, and that both opposite stumps are hemostatic and in proper condition for release, the clamping jaws are released, and the instrument withdrawn. The resultant stumps are illustrated in Figure 14, and the shaded areas in Figures 12-14 illustrate areas which have been subject to coagulation.

During the foregoing procedure, the irrigation outlet 36 is employed as an aspirating conduit, whereby any fumes which would otherwise impede visibility are constantly capable of being drawn outwardly through the tube 30.

It is further to be noted that the foregoing procedure is accomplished, in its entirety, under maintained illuminated visibility, the jaws and electrode being so mounted, constructed, and arranged that a full and unimpeded field of illuminated vision is constantly maintained, this field of vision encompassing the entire clamped area of the adhesion. The effect of the coagulating procedure may thus be carefully and continuously observed, and the movements and effect of the cutting electrode are similarly under constant, clear, and unimpeded illuminated vision.

The instrument illustrated in Figures 6–10 is of a slightly modified character in which the adhesion is engaged at only one area, instead of at two spaced areas, and in which the cutting electrode is of a slightly different character and mode of operation. In employing the instrument of Figures 6–10, only one of the resultant stumps is maintained in engagement during and after the cutting procedure; and while, from many aspects, the instrument of Figures 1–5 is obviously preferable, there are many instances in which the instrument of Figures 6–10 may be used to advantage, despite the fact that only one stump is ultimately held in engagement. For example, where the cut is to be effected close to one end of an adhesion, the modified type of instrument may be preferable.

It will be understood that the usual endoscopic sheath or tube is provided, although it has not been illustrated in Figures 6–10, and that the plug 80, the fork 81, and the pin 82 are provided on the instrument illustrated for the reasons hereinbefore assigned.

The plug 80 is similarly provided with the rearwardly extending support 83 terminating in the bearing 84 which engages the rear end of the telescope 85. The terminal block for the rear end of the active cutting electrode is in this case designated by the reference numeral 86 and is rigidly secured to the support 83, as by means of the stud 87.

The scissors-like control mechanism 88 is also provided, as in the preceding embodiment, with one handle being secured, as at 89, to the plug 80, and the other handle being pivoted, as at 90, so as to be movable between the full-line and the dot-and-dash-line positions indicated in Figure 6. The free end of the movable handle is not forked, but is pivotally connected, as at 91, to the rear end of a single control rod 92 which actuates the movable jaw.

Extending forwardly from the plug 80 is the elongated stem 93 which carries the laterally disposed guide channel or tube 94, and the opposite guide channel or tubes 95 and 96. The channel 94 snugly yet slidably accommodates the telescope 85 which is preferably, as before, of the general character which commands a forwardly oblique field of vision. The telescope is laterally mounted, in this case, however, so that the axis of its field of vision is directed toward the left in Figure 9, and so that the operator will command a view of the several operative parts in substantially the same manner as the reader is viewing Figures 6 and 8.

Secured to the forward end of the stem 93 is the rigid or immovable jaw 97, and pivoted to the rear end of this jaw, as at 98, is the complementary movable jaw 99. The movements of this jaw are controlled by the rod 92 which extends forwardly through the guide tube 95 and which is pivotally connected at its forward end, as at 100, to the movable jaw 99. The reciprocation of the rod 92, by manipulations of the mechanism 88, cause the movable jaw 99 to move between the closed full-line position of Figures 6 and 8 and the open dot-and-dash-line position of these figures.

The binding post 101 is mounted upon the plug 80, and need not necessarily be insulated, establishing an electrical connection with all the metallic portions of the instrument not specifically insulated therefrom. This binding post may thus serve, as in the preceding embodiment, to establish an electrical connection between a suitable source of coagulating current and both jaws 97 and 99.

The cutting electrode is in this case composed of an electrode wire 102 which is mounted for pivotal movement between the full-line position of Figures 6 and 8 and the dot-and-dash-line position of these figures. This movement is accomplished by constructing the wire 102 with a bellcrank rear end, pivoted, as at 103, to the insulating support 104 which is rigidly secured to the fixed jaw 97 by means of the clamp or tab 105. The free rear end of the bellcrank member is pivotally connected, as at 106, to the forward end of a control wire 107 which extends rearwardly into and through the insulating guide tube 108. The tube 108 is ensheathed in a metallic sheath 109, and the tubes 108 and 109 extend rearwardly for the full length of the instrument and terminate in the interior of the terminal block 86. The sheaths 108 and 109 are immovable, but the wire 107 is axially movable and is connected at its rear end to the interior conductive portion of the electric binding post 110. This binding post is rotatably mounted within the block 86 in axial association with the rotatable control handle 111. The latter is adapted to be swung between the full-line and the dot-and-dash-line positions of Figure 6, and is connected to the wire 107 in such a manner (not illustrated) that these movements will reciprocate the wire 107 axially.

The specific construction and arrangement of the terminal block 86 and its associated parts has not been illustrated since it has no material direct bearing upon the features of our present invention, and since any suitable mechanism of the general character indicated will suffice. It is to be noted, however, that the binding post 110 and the major portion of the block 86 are of insulating material, so that an insulated electrical connection may be established between the interior of the binding post 110 and the electrode wire 102. Also, the movements of the control handle 111, regardless of its exact construction and arrangement, are adapted to effect a reciprocal axial movement of the control wire 107. By advancing this wire the electrode member 102 is swung into the full-line position; and by retracting the wire 107 (by swinging the handle 111 into the dot-and-dash position), the electrode member 102 pivots around the pivot 103 into the dot-and-dash position.

In the construction illustrated, the insulating support 104 is shown as an integral continuation of the insulating sheath 108 through which the control wire 107 extends, but it will be understood that this construction is not essential.

The mode of operation of the instrument of Figures 6–10 is illustrated most clearly in Figures 15–16. The adhesion 112 which is to be cut is first engaged by the jaws 97 and 99 in substantially the manner illustrated in Figure 15, adjacent to the area through which the severance is to be effected. During this procedure, the cutting electrode 102 is in the inoperative or retracted position. Suitable coagulating current is then caused to pass through the clamped area, preferably by connecting the patient with a suitable indifferent electrode, establishing an electrical connection between the indifferent electrode and one terminal of a source of coagulating current, and establishing an electrical connection between the other terminal of such current source and the binding post 101.

After the desired degree of coagulation has been effected, similar electrical connections are made to conduct a cutting current to the cutting electrode 102. This will involve a connection between a source of cutting current and the binding post 110. The cutting electrode is then swung into its operative position, i. e., toward the full-line positions of Figures 6 and 8, whereby it will be caused to sweep transversely through the coagulated clamped area of the adhesion 112, thereby cutting through the latter, as indicated in Figure 16. During this procedure, the coagulating connections will have been disconnected, or at least rendered inoperative.

These series of steps are, as before, under complete and fully illuminated vision at all times; the fumes that are generated may be withdrawn in the same manner as hereinbefore described; and the cutting is effected without releasing the clamping jaws from engagement with the adhesion. As a result, one of the stumps remains in engagement until after the cutting has been effected, as indicated in Figure 16, and this permits the surgeon carefully to inspect and examine the same before finally releasing it.

We also contemplate providing the jaws, in either modification herein described, with several teeth which are relatively long and in the nature of pins or the like, whereby the jaws may be partially separated without completely releasing the stump or stumps which they are engaging. This permits the surgeon to inspect the areas that have lain directly underneath the jaw surfaces, these areas being exposed by partial opening of the jaws, but the stumps being as yet unreleased by virtue of the longer teeth or pins which still project into them.

In Figures 17, 18, and 19, we have illustrated a few possible modifications in the mode of applying the coagulating current to the area to be coagulated. Referring back to Figure 11, for the moment, we will state that it frequently happens that the desired coagulation does not always take place with the desired degree of efficacy, at exactly the area engaged by the jaws, where the passage of current is effected by means of an indifferent electrode at a remote portion of the body. For example, if the adhesion is attenuated at an unclamped remote area, coagulation may take place at the attenuated area because of the concentration of current at such area and leave the clamped area insufficiently coagulated. It is, therefore, obvious that under certain circumstances it may be desirable to dispense with the indifferent electrode and to pass the coagulating current to and through the desired areas by means of a bi-polar association of parts and arrangement of electrical connections, whereby one of the jaws (e. g. the jaw 53) is connected to one terminal of the source of coagulating current, while the other jaw (e. g. jaw 55) is connected to the other terminal of such current source. With this mode of construction and electrical connection, the coagulating current will be caused to pass directly from one jaw to the other, and hence exactly through the areas which are to be coagulated. In a procedure of this character, the instrument will obviously require slight modification to render the two jaws 53 and 55 mutually insulated, and to provide for the establishment of separate connections to each of these jaws, respectively. This possibility and mode of operation is illustrated in Fig. 17 and is relevant to the present invention in so far as it illustrates a modified structural and electrical association of parts for carrying out the essential steps of our improved process.

A further possible modification is illustrated in Figure 18 in which two pairs of jaws similar to those illustrated in Figures 6-10 are provided. This would involve a modification of the instrument to duplicate the jaws 97 and 99, the jaws of one set being spaced from the jaws of another so that the adhesion is engaged at two spaced areas, as in Figure 11. Here, again, instead of having recourse to an indifferent electrode, it might be feasible to connect one pair of jaws to one terminal of a source of suitable coagulating current, and to connect the other pair of jaws to the other terminal of such source, whereby the coagulating current is caused to pass from one set of jaws to the other, and hence through the area which it is sought to coagulate.

In Figure 19, we have illustrated a further modification in which a single pair of jaws, as in Figures 6-10, 15, and 16 is adapted to be used in a bi-polar manner. One of the jaws is connected to one terminal of a source of coagulating current, and the other jaw to the other terminal of such source, whereby the current would pass directly from one jaw to the other and hence directly through the area to be coagulated. With such a procedure, the instrument of Figures 6-10 would have to be modified to mount the jaws in mutually insulated relationship and to provide for separate electrical connections to the respective jaws.

The plus-and-minus signs appearing on Figures 17-19 are intended diagrammatically to illustrate the bi-polar modes of procedure hereinbefore referred to; and since these figures are diagrammatic, specific reference numerals have been omitted, the purpose and significance of these figures being believed to be clear from the description and discussion hereinbefore contained.

The instrument of Figures 6-10 may in itself, without modification, be employed as a bi-polar instrument by bringing the electrode 102 into contact with the adhesion prior to the cutting operation, and by connecting the jaws 97—99 to one terminal of a source of coagulating current, and connecting the electrode 102 to the other terminal of such source. These connections are easily established at the binding posts 101 and 110, respectively, and the coagulation current will be caused to pass directly through the area ultimately to be cut. With such a procedure, the coagulating operation is followed by establishing a connection at the binding post 110 with a source of cutting current, and completing the latter circuit either by utilizing the jaws 97—99 as an indifferent electrode, or by relying upon the usual remote indifferent electrode.

Similarly, the device of Figures 1-5 may, without modification, be employed as a bi-polar instrument. The opposite terminals of a coagulating current may, for example, be connected, respectively, to the binding posts 40 and 71, whereby such current will pass from the jaws 53—55 to the electrode 66, the latter having been brought into contact with the adhesion. This coagulating procedure would then be followed by making an electrical connection at the binding post 71 with one terminal of a source of cutting current, and employing either the jaws 53—55 as the indifferent electrode or relying upon the usual remote indifferent electrode.

These possible modifications in mode of electrically connecting the instrument and its associated parts are mentioned herein for the purpose of illustrating the possibility of carrying out our present method in a variety of ways, the essential characteristics of the method lying in the procedural steps of engaging the adhesion, coagulating it, cutting it, and not releasing it until after the cutting has been accomplished.

It will also be obvious that the swinging type of electrode, as illustrated in Figures 6–10 at 102, may be adapted or employed, if desired, with a jaw arrangement of the character illustrated in Figures 1–5. By the same token, the axially reciprocable type of cutting electrode illustrated at 66 in Figures 1–5 may be adapted or employed, if desired with a jaw construction and arrangement of the character illustrated in Figures 6–10.

While no mention has been made herein of any particular type of high-frequency current, other than by referring to the currents as "cutting" or "coagulating" currents, it is believed that the significance of these terms will be fully understood by those skilled in the art of electro-surgery as the same is practiced at the present day. However, it may be mentioned that a high-frequency generating apparatus of the general character illustrated in the copending application of Frederick Charles Wappler, Serial Number 581,908, Patent 1,962,796 is admirably suited for producing the two types of currents hereinbefore referred to.

In general, it will be obvious that changes in the details herein described and illustrated for the purpose of explaining the features of our invention may be made by those skilled in the art without departing from the spirit and scope of the invention as expressed in the appended claims. It is therefore intended that these details be interpreted as illustrative, and not in a limiting sense.

Having thus described our invention, and illustrated its use, what we claim as new and desire to secure by Letters Patent is—

1. In an instrument for electro-surgical severance of an adhesion, a clamping member constructed and arranged to engage the adhesion at spaced transverse areas, a cutting electrode adjacent to and insulated from the clamping member and mounted for movement in a transverse plane lying between said spaced areas, means for conducting a cutting current to said cutting electrode, and means for moving said electrode to effect a severance of the adhesion between the clamped areas, whereby the resultant stumps remain engaged by the instrument.

2. In an instrument for electro-surgical severance of an adhesion, a clamping electrode constructed and arranged to engage the adhesion transversely thereof, a cutting electrode adjacent to and insulated from the clamping electrode and mounted for movement in a plane transverse to the adhesion, means for conducting a coagulating current to said clamping electrode so as to coagulate the clamped area, means for conducting a cutting current to said cutting electrode, and means for moving said cutting electrode to effect a severance of the adhesion through the coagulated area thereof, whereby at least one of the resultant stumps remains engaged by the instrument.

3. In an instrument for electro-surgical severance of an adhesion, a clamping electrode constructed and arranged to engage the adhesion transversely thereof and comprising a pair of complementary conductive jaws, a cutting electrode adjacent to and insulated from the clamping electrode and comprising an attenuated wire mounted for movement in a plane transverse to the adhesion, means for conducting a coagulating current through said jaws to and through the area clamped thereby, means for conducting a cutting current to said wire, and means for moving said wire to effect a severance through the coagulated area of the adhesion, whereby at least one of the resultant stumps remains engaged by said jaws.

4. In an instrument for electro-surgical severance of an adhesion, a clamping electrode constructed and arranged to engage the adhesion at spaced transverse areas, a cutting electrode adjacent to and insulated from the clamping electrode and mounted for movement in a transverse plane lying between said spaced areas, means for conducting a coagulating current to said clamping electrode so as to coagulate the adhesion at and between the clamped areas, means for conducting a cutting current to said cutting electrode, and means for moving said cutting electrode to cut through the coagulated area of the adhesion, whereby the resultant stumps remain in engagement by the instrument.

5. In an instrument for electro-surgical severance of an adhesion, a clamping electrode comprising two spaced pairs of complementary conductive jaw elements adapted to engage the adhesion at spaced transverse areas, a cutting electrode insulated from the clamped electrode and comprising an attenuated wire mounted for movement in a transverse plane lying between said spaced areas, means for conducting a coagulating current to said clamping electrode so as to coagulate the adhesion at and between the areas engaged by said two pairs of jaw elements, means for conducting a cutting current to said wire, and means for moving said wire to effect a severance of the adhesion through the coagulated area between said two pairs of jaw elements, whereby the resultant stumps remain in engagement by the instrument.

6. In an instrument for electro-surgical severance of an adhesion, an endoscopic sheath, an elongated supporting stem insertable into said sheath, a clamping member mounted at the forward end of said stem and adapted to engage the adhesion transversely thereof, means carried by said stem for controlling the operation of said clamping member from the rear end of the instrument, a cutting electrode at the forward end of said stem adjacent to said clamping member, said electrode being mounted for movement in a plane transverse to the adhesion, an electric binding post at the rear end of said stem, means for conducting a cutting current from said binding post to said cutting electrode, means controllable from the rear end of the stem for moving said electrode to effect a severance of the adhesion adjacent to the clamped area, and telescopic and illuminating means carried by said stem for commanding an illuminated visibility of the clamping member, the clamped area, and the cutting electrode.

7. In an instrument for electro-surgical severance of an adhesion, an endoscopic sheath, an elongated supporting stem insertable into said sheath, a clamping member mounted at the forward end of said stem and adapted to engage the adhesion at spaced transverse areas, means carried by said stem for controlling the operation of said clamping member from the rear end of the instrument, an electrode wire at the forward end of said stem adjacent to said clamping member and mounted for movement in a transverse plane lying between said spaced areas, an electric binding post at the rear end of said stem, means for conducting a cutting current from said binding post to said wire, means controllable from the rear end of the stem for moving said wire to effect a severance of the adhesion between the clamped areas, and telescopic and illuminating means carried by said stem for commanding an illuminated visibility of the clamping member, the clamped areas and the area therebetween, and the electrode wire.

8. In an instrument for electro-surgical severance of an adhesion, an endoscopic sheath, an elongated supporting stem insertable into said sheath, a clamping electrode mounted at the forward end of said stem and adapted to engage the adhesion transversely thereof, means carried by said stem for controlling the operation of said clamping electrode from the rear end of the instrument, means for conducting a coagulating current along said stem to said clamping electrode so as to coagulate the clamped area, a cutting electrode at the forward end of said stem adjacent to said clamping electrode and mounted for movement in a plane transverse to the adhesion, an electric binding post at the rear end of said stem, means for conducting a cutting current from said binding post to said cutting electrode, means controllable from the rear end of the stem for moving said cutting electrode to effect a severance of the adhesion through the coagulated area thereof, and telescopic and illuminating means carried by said stem for commanding an illuminated visibility of the clamping electrode, the clamped area, and the cutting electrode.

9. In an instrument for electro-surgical severance of an adhesion, an endoscopic sheath, an elongated supporting stem insertable into said sheath, a clamping electrode mounted at the forward end of said stem and adapted to engage the adhesion at spaced transverse areas, means carried by said stem for controlling the operation of said clamping electrode from the rear end of the instrument, means for conducting a coagulating current along said stem to said clamping electrode so as to coagulate the adhesion at and between the clamped areas, an electrode wire at the forward end of said stem adjacent to said clamping electrode and mounted for movement in a transverse plane lying between said spaced areas, an electric binding post at the rear end of the stem, means for conducting a cutting current from said binding post to said wire, means controllable from the rear end of the stem for moving said electrode wire to effect a severance of the coagulated adhesion between the clamped areas, and telescopic and illuminating means carried by said stem for commanding an illuminated visibility of the clamping electrode, the clamped areas and the area therebetween, and the electrode wire.

10. In an instrument for electro-surgical severance of an adhesion, an endoscopic sheath, an elongated supporting stem insertable into said sheath, a clamping member mounted at the forward end of said stem and adapted to engage the adhesion transversely thereof, means carried by said stem for controlling the operation of said clamping member from the rear end of the instrument, a cutting electrode at the forward end of said stem adjacent to said clamping member, said electrode being mounted for movement in a plane transverse to the adhesion, an electric binding post at the rear end of said stem, means for conducting a cutting current from said binding post to said cutting electrode, means controllable from the rear end of the stem for moving said electrode to effect a severance of the adhesion adjacent to the clamped area, telescopic and illuminating means carried by said stem for commanding an illuminated visibility of the clamping member, the clamped area, and the cutting electrode, and means for withdrawing fumes rearwardly through the sheath to prevent impairment of said visibility.

11. In an instrument for electro-surgical severance of an adhesion, a clamping electrode and a cutting electrode mounted in mutual adjacence, remotely controlled means for adjusting the clamping electrode to engage the adhesion, means for conducting a coagulating current to said clamping electrode so as to coagulate the clamped area, means for conducting a cutting current in an insulated manner to said cutting electrode, and remotely controlled means for sweeping the latter transversely through the coagulated area.

REINHOLD H. WAPPLER.
FREDERICK CHARLES WAPPLER.